Aug. 2, 1938.   O. H. HUNT   2,125,345
MULTIPLE RECORDING INSTRUMENT
Filed Feb. 25, 1936   3 Sheets-Sheet 1

Fig.1.

INVENTOR.
OZRO H. HUNT
BY
ATTORNEY.

Aug. 2, 1938.     O. H. HUNT     2,125,345
MULTIPLE RECORDING INSTRUMENT
Filed Feb. 25, 1936     3 Sheets-Sheet 2
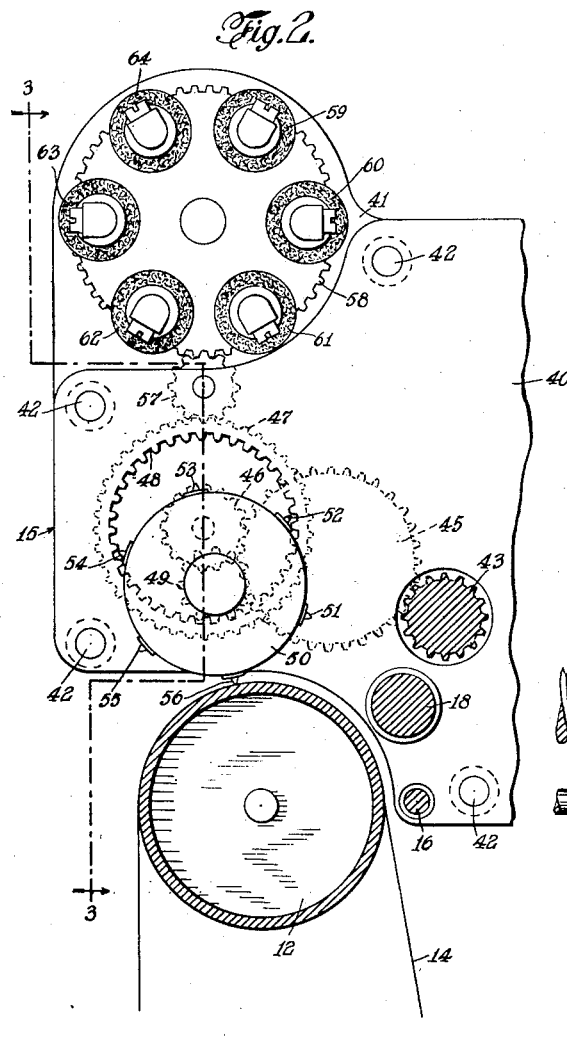
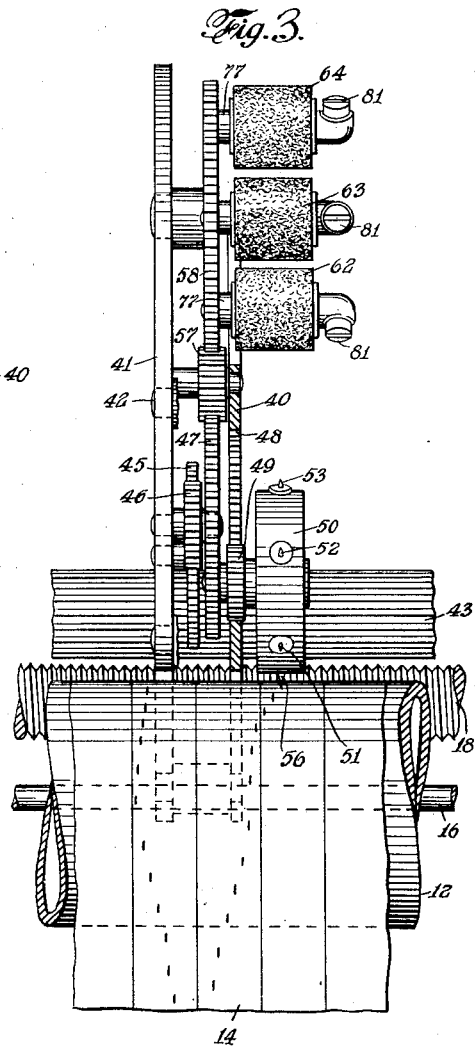
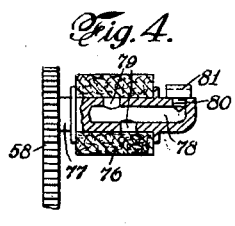
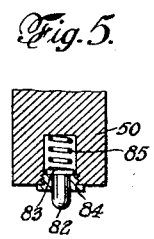
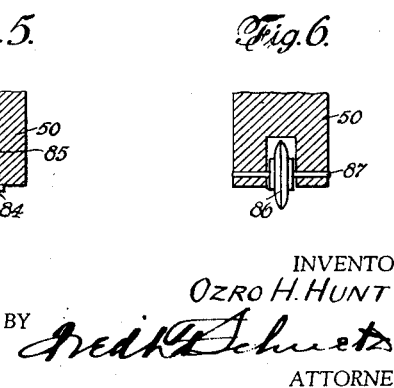
INVENTOR.
OZRO H. HUNT
BY
ATTORNEY.

Aug. 2, 1938.  O. H. HUNT  2,125,345
MULTIPLE RECORDING INSTRUMENT
Filed Feb. 25, 1936  3 Sheets-Sheet 3

INVENTOR.
OZRO H. HUNT
BY
ATTORNEY.

Patented Aug. 2, 1938

2,125,345

UNITED STATES PATENT OFFICE 2,125,345

MULTIPLE-RECORDING INSTRUMENT

Ozro H. Hunt, Waterbury, Conn., assignor to The Bristol Company, Waterbury, Conn., a corporation of Connecticut Application February 25, 1936, Serial No. 65,574

9 Claims. (Cl. 234—66)

This invention relates to recording instruments, and more particularly to that class of recorders in which there are produced from a single measuring member and on an advancing record chart a plurality of individual records or graphs of values representative of a number of more or less independently variable magnitudes.

In the use of automatic recording instruments, such, for example, as that set forth in my co-pending application Serial No. 687,330, filed August 29, 1933, which has matured into Patent No. 2,082,109, dated June 1, 1937, it is frequently desirable to adapt a single instrument to the measuring and recording of a plurality of magnitudes, this practice being governed by considerations of cost and by the ease with which comparisons may thus be made among graphs of independently varying magnitudes when recorded upon a chart common to all of the graphs.

There have been developed a number of instruments and devices for imprinting charts with a variety of records, such, for example, as that set forth in U. S. Patent No. 1,125,699 issued January 19, 1915, some of these records consisting of different characters or indicia, and others being applied in different colors, for the purpose of identifying the several records. As an example of this practice may be mentioned the recording potentiometer when used as a pyrometer, and measuring successively the potentials developed in each of a plurality of thermocouples exposed to more or less different temperatures. A multi-contact switch is provided in the thermocouple circuit and serves to connect successive couples individually to the instrument; and synchronously with this action, the distinguishing indicia on the recording device are successively juxtaposed to the chart.

The recording device is allowed time to assume a position corresponding to the particular temperature then to be recorded, after which an intermittently acting depressor mechanism, or its equivalent, is brought into engagement with the recording member, causing it to imprint an identifying mark on the record chart in a position to correspond to the then value of the temperature to which the particular couple in circuit is exposed. After the record is made, the switch is automatically moved to include a different couple in circuit, the distinguishing indicia on the recording device moved on to a corresponding position, and the recording process repeated as hereinbefore set forth. The continuous repetition of this action results in there being imprinted on the chart a series of marks, each having some means of identification as to the source with which it is associated; and a group of lines drawn each through points having like identifying marks will provide a family of graphs or curves representing on a common chart the successive values of a number of more or less independent variables.

It will be seen that in a device of this nature the recording element is necessarily subject to three types of motion, as follows: (1) motion of a recording element to a setting to identify the particular thermocouple in circuit, (2) motion of the recording member to a position, relative to the recording surface, corresponding to the value of the temperature to be recorded, (3) motion of the recording element into engagement with the chart surface for the purpose of imprinting a mark upon the chart, which serves not only as the record for the particular magnitude but also to identify the same.

In such devices as have heretofore been developed for this purpose, the mechanism for effecting the double motion of the recording element in addition to its positioning along the scale of the instrument has necessarily been of a complicated nature, requiring a relatively large number of intermittently moving parts, likely to get out of order and interfere with accurate registration.

It is an object of this invention to provide a recording device of the above nature which shall embody a recording member having a minimum number of moving parts, and these permanently engaged and subjected to continuous motion only.

Another object is to provide a device of the above nature in which the record shall be distinctly marked and the several graphs readily distinguishable from one another.

A further object lies in the provision of a device of the above nature in which the operation shall be the same at all speeds, and the speed of action shall not be restricted by limitations of the recording mechanism.

Still another object is to provide a device of the above nature which shall be of rugged construction, not readily susceptible to mechanical damage nor liable to errors between the value of the measured magnitude and the registration upon the chart.

In carrying out the invention, the recording member, which is to be successively located along the chart under command of the magnitudes of the respective conditions, carries a plurality of marking elements corresponding to the number of conditions to be measured. Suitable timing mechanism is provided for continuously driving at uniform velocity a shaft whose rotation is timed with means for switching in the various magnitudes in succession.

The recording member is connected with the said shaft through intermediate mechanism for transmitting rotation therefrom to a printing wheel mounted on the recording member and also for revolving the printing wheel. The latter carries radially the different marking elements, the motion given thereto by the transmission mechanism being such that these marking elements traverse a hypocycloidal path at right angles to the chart and are successively juxtaposed thereto.

Furthermore, inking means are associated with the printing wheel and embody a plurality of inking pads corresponding to the number of marking elements. This inking means is likewise supported by the recording member or carriage therefor; and through means driven from said intermediate mechanism successively juxtaposes an inking pad to a predetermined marking element. It will be appreciated that both the operation of presenting a marking element to the record chart as well as an inking pad to its particular marking element is a continuous one resulting from the transmission of rotation from the aforesaid shaft to the recording member supported on a carriage slidable along the record chart. The driving mechanism for the timing element with respect to the printing and inking mechanism is such that upon the recession of one of the marking elements from the recording chart, a different magnitude will be connected and that sufficient time will be afforded the potentiometer balancing mechanism, for example, to enable the recording member carriage to assume a position representative of the measured magnitude before the succeeding marking element engages the chart. It will be appreciated, however, that while under ordinary operating conditions the marking and inking mechanisms are continuously actuated, it is conceivable that conditions may arise where it becomes desirable periodically to interrupt the transmission of motion to the said marking and inking mechanisms, as in instances where the periods of switching in the different magnitudes are greatly prolonged.

The nature of the invention, however, will best be understood when described in connection with the accompanying drawings, in which:

Fig. 1 is a perspective view of an instrument of the recording potentiometer type, adapted for multiple-point pyrometry, and fitted with a recording member embodying the novel features of the invention.

Fig. 2 is a fragmentary side elevation of the recording mechanism to an enlarged scale.

Fig. 3 is a transverse section taken on the line 3—3, Fig. 2.

Fig. 4 is a longitudinal sectional view of an inking member adapted for use with the recording mechanism.

Fig. 5 is a vertical section through a recording element which may be utilized in the novel recorder.

Fig. 6 is a similar view of an alternative form of the same.

Figure 7:
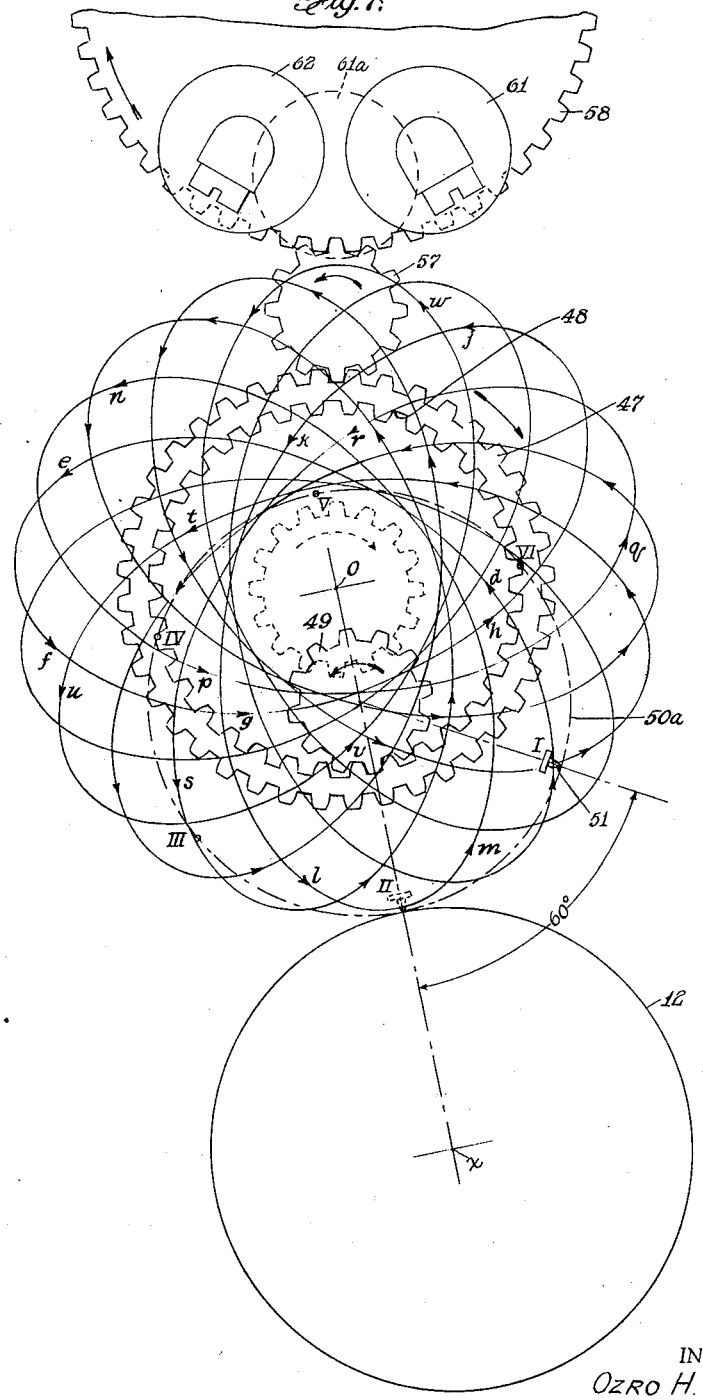
Fig. 7 is an elevation of the transmission mechanism for communicating the desired positioning movement to the different recording elements, together with a geometrical showing of the path travelled by a recording element of the recording member.

Referring to Fig. 1, 10 and 11 designate side plates of the frame of a recording instrument of the self-balancing potentiometer type, which plates serve to support and maintain in operative relationship certain coacting elements, the nature and purposes of which will be hereinafter set forth. A record roll 12, driven at a constant angular velocity by a timing element represented by the case 13, carries on its outer surface a continuous strip of chart paper 14, whereon are to be imprinted markings providing a graphical representation of the magnitudes of a group of more or less varying conditions.

A carriage 15 is slidably mounted upon two guide rails 16 and 17 supported by the frame plates 10 and 11, and is free to move thereon in a direction parallel to the axis of the record roll 12. A lead-screw 18, extending the length of travel of the carriage 15 and threadedly engaging the same, is adapted to be rotated in either direction by a reversible motor member 19, and thereby to position the said carriage 15 to any point in its line of travel.

Extending longitudinally of the path of travel of the carriage 15, and in proximity thereto, is an extended slide-wire element 20 forming a part of the usual potentiometer circuit, which is completed by a battery 21 and a current-adjusting rheostat 22. Borne upon, but electrically insulated from, the carriage 15 is a sliding contact 23 adapted to engage the slide-wire element 20 at any point of its extended length, and, through a flexible lead 24, to provide electrical connection to one terminal of a galvanometer 25. The circuit of the galvanometer 25, in relation to the potentiometer circuit, is completed through one or another of a plurality of sources of electromotive force, as the thermocouples 26, 27, 28, 29, 30, 31, in the following manner.

A multiple-contact dial-switch 32, having segments to correspond to the respective aforesaid thermocouples, and electrically connected thereto, includes a rotatable contact arm 33 driven from the timing element 13, through a suitable gearing indicated at 34 and which may be in the nature of the so-called "Geneva" gear, in such a manner that the contact arm will progressively advance from segment to segment. The said contact arm thereby becomes electrically connected to one side of each of the thermocouples in turn, and is connected by a conductor 35 to the free terminal of the galvanometer 25, while the free ends of the thermocouples are connected to a common lead 36, and thereby, as shown, to the left-hand end of the slide-wire element 20.

Thus, by the well-known principle of the potentiometer, any potential difference set up by the particular thermocouple which happens to be connected to the galvanometer through the switch 32 will be more or less balanced by the potential existing along the slide-wire 20 between its junction point with the lead 36 and its point of engagement with the contact 23, due to current flowing through the same from the battery 21; and any departure from a condition of exact balance between the potentials will produce a deflection of the galvanometer 25. By adjusting the position of the contact 23 along the slide-wire there may be obtained an exact balance of potentials, at which time the linear distance of the contact from the left-hand end of the slide-wire will be a measure of the potential of the particular thermocouple connected to the circuit, and hence, on a suitably graduated scale, of the temperature to which that couple is exposed.

As a means of positioning the contact 23 along the slide-wire, the carriage 15 upon which it is mounted may be moved in either direction by rotation of the lead-screw 18; and this balancing action may be made automatic by placing the motor 19 under command of the galvanometer 25. While, as indicated in the drawings for purposes of simplicity, the control of the motor is shown as by the contacts 37 and 38 directly engaged by the pointer of the galvanometer, a preferred embodiment of the self-balancing mechanism is that set forth in the above-mentioned copending application, Serial No. 687,330; and for this device and for other elements as thus far set forth, no invention is herein claimed.

In a recording potentiometer of the type wherein only one source of electromotive force is to be measured, the carriage may be fitted with a single pen, continuously engaging the surface of the record chart and inscribing thereon a single line which at any time represents in its position on the paper the then magnitude of the E. M. F. under measurement. Where a plurality of sources of E. M. F. such as the above-mentioned thermocouples, are successively to be connected to the measuring circuit, it is necessary that provision be made for disengaging a marking element from the record surface during the relatively rapid transition of the carriage from the position representing one E. M. F. value to that representing a succeeding value, and that, as a condition of balance is attained, there be made upon the chart a record in the form of a dot or other type of marking. Also, means must be provided whereby the markings representing the voltages of each couple may be definitely associated with that couple and positively distinguished from those associated with other couples. With these markings being made consecutively upon a slowly travelling paper chart, the record for each of the thermocouples will take the form of an interrupted line, and the existing portions, by their common characteristic of form of color may readily be identified, so that in effect a plurality of independent graphs of as many varying magnitudes will be inscribed on a common record sheet.

With a view to accomplishing this purpose there have been tried various expedients; and since it is required that there be transmitted to the marking member on the movable carriage the combination of progressive motion to correspond to that of the multiple-contact switch, and a marking action at the time the position of the carriage indicates the magnitude of the measured condition, these expedients have been very intricate in their nature. They involve, for example, in the mechanisms heretofore proposed ratchets, levers, linkworks, and generally in addition to the mechanism for positioning the carriage, a dual connection between the mechanism mounted upon the carriage and that associated with the stationary parts of the instrument.

In the arrangement embodying the present invention, there is provided a mechanism associated with the slidable carriage and having a system of gearing, permanently meshed and continuously operating, as through connection with a rotatable shaft. A plurality of marking elements are thereby successively brought into engagement with the record surface in proper order, each imprinting its distinguishing mark on said surface, without the use of intermittently operating parts or disengaging elements of any kind.

Referring more particularly to Figs. 2 and 3, there are shown the details of the recording mechanism, mounted upon, and forming a part of, the carriage 15, which includes frame-plates 40 and 41 formed into a rigid structure by posts 42 to constitute the body of the carriage. This is slidably mounted upon the guide-rails 16 and 17 and threadedly engaged with the lead screw 18, by whose rotation it may be integrally moved in either direction along the said guide rails.

An axially extended gear member 43 (formed, for example, of "pinion rod") is fixed to the shaft 44 and mounted upon the stationary part of the instrument with its axis parallel to the guide rails 16 and 17, and permanently engaged with the mechanism of the timing element 13, so that it is continuously driven at a uniform velocity, and maintains also a definite synchronous relationship with the arm 33 of the switch 32, whose gearing 34 may expediently be driven by an extension of the shaft 44.

The extended gear member 43 passes freely through openings in the side plates 40 and 41 of the carriage 15 and meshes with an idler 45 rotatably mounted within the frame of the carriage. Rotatably mounted upon the plate 40 is a pinion member 46, meshing with the idler 45 and having fixed thereto a gear member 47. Formed in, or affixed to, the side plate 40, and concentric with the gear 47 and pinion 46, is an internal gear 48. Rotatably mounted upon the gear 47, and eccentric thereto, is a pinion or planet wheel 49 meshing with the internal gear 48, so that as the gear 47 rotates about its center the pinion 49 will be carried about the common axis of gears 47 and 48 and will at the same time rotate on its own axis as it maintains rolling contact with the internal gear 48, thus causing any point on its pitch circle to describe a path in the form of a hypocycloid. Fixed to the pinion 49, and both revolving and rotating therewith, is a cylindrical member 50 constituting a printing wheel, and having uniformly spaced about its periphery a number of marking elements 51, 52, 53, 54, 55, and 56, each adapted to engage in turn the record surface of the chart and imprint thereon an identifying mark.

Meshing with the gear 47 is an idler 57, rotatably mounted on the frame of the carriage, and meshing in turn with said idler is a gear member 58 rotatably mounted upon the plate 41 and carrying the inking mechanism consisting of a plurality of cylindrical pads 59, 60, 61, 62, 63, and 64, formed of absorbent material, each mounted upon a hollow spindle as hereinafter disclosed.

Before setting forth details of mechanical construction of the inking and printing elements, the action of an individual marking element may be considered; and for this purpose reference may be had to Fig. 7, wherein is indicated the path followed by one of the marking points during the various parts of a single cycle of operation. The present embodiment of the invention is shown as for an instrument adapted to record individually the temperatures of six distinct thermocouples, there being six segments to the dial switch 32 and the six different marking elements 51, 52, 53, 54, 55, and 56 on the printing wheel 50. For such a "six-point" instrument a preferred combination of gearing to give the desired action may be as follows: The internal gear 48 is provided with 34 teeth, while pinion 49 will have 12 teeth; gear 47, 40 teeth; and gear 58, 48 teeth. The pinion 49 rolling within the gear 48 constitutes a planetary element, in which, as the gear 47, carrying the said element, is caused to turn about its axis of rotation, the printing wheel 50 fixed to the pinion 49 will partake of a compound motion, rotating about its own axis as it revolves about the axis of gear 47, so that points at various radial distances from its axis will describe cycloidal paths of different types, a point on the pitch circle of the pinion 49 following a true hypocycloid, and a point on a radius greater than that of the pitch circle a cycloidal path of the form known as hypotrochoid.

In Fig. 7, circle 50a is the line upon which lie the said six marking elements carried by the printing wheel 50 at the moment any one of them is in contact with the record roll 12. For the purpose of following the path traced by a marking element, consideration may be given to one of the six elements, e. g., element 51, taking as an initial position that in which it is located when the circle 50a contacts the record roll 12 with the marking element 51 positioned away from the point of contact by an amount equivalent to 60 degrees of the arc of circle 50a, this position being indicated by the numeral I. If, now, as gear 47 is caused to rotate in a clockwise sense as seen in the diagram, carrying the pinion 49 around the internal gear 48, the pinion will rotate about its own axis in a counter-clockwise sense, and the marking element 51, lying on an extended radius of the pinion, will partake of a compound motion, leaving the point I, following in the direction of the arrows shown, and generating a hypocycloidal curve $d$—$e$—$f$—$g$—$h$—$j$—$k$—$l$, of the form known as a hypotrochoid; and, upon completion of one revolution of the wheel 50 about the axis O, reaching the point II (indicated by dotted lines), where it makes contact with the surface of the record roll and imprints a characteristic marking upon the paper chart carried thereby.

The action of the related parts may be further clarified by considering the actual ratios of the related gears and pinions, particularly in the planetary train. As the printing wheel 50 completes a single revolution of 360 degrees about the axis O, represented by 34 teeth on the internal gear 48, the pinion 49, having 12 teeth, will have rotated counter-clockwise about its own axis through an angle represented by a single revolution multiplied by the tooth ratio, i. e., $360 \times 34/12 = 1020$ angular degrees, which is the equivalent of three complete revolutions, less 60 degrees. Thus, with the axis of the printing wheel 50 returned to its original location, with its center on the line $o$—$x$ joining the center $x$ of the record roll 12 and the axis O, the wheel 50 will have been rotated 60 degrees in a clockwise sense from its original angular position, and the marking element 51 will have been translated from the position I to the position II, and in the course of its excursion will have traced out two lobes of the generated hypotrochoid as above set forth.

Similarly, upon continuance of the printing wheel's simultaneous revolution about the axis O and rotation about its own axis, the marking element 51 will describe the path $m$—$n$—$p$—$q$—$r$—$s$; and, when the printing wheel again reaches its starting location, the marking element will reach the point III on the circle 50a. In the same manner, as the motion of the mechanism is continued, the marking element will describe similar curved paths, and at the completion of each revolution of the gear 46 and associated parts, as the printing wheel 50 passes through its original location, will intersect the circle 50a successively at points IV, V, and VI, returning to its starting point I upon completion of the sixth revolution.

The number of lobes constituting the complete hypotrochoidal curve traced out by any one marking element may be determined as follows:

Number of teeth passing in mesh to generate 1 lobe=number of teeth on pinion=12.
Angle subtended by 1 lobe at axis O=12/34 of circle.
Number of lobes generated by 1 revolution of gear 47=1/(12/34)=34/12.
Number of revolutions of gear 47 to complete cycle of operation=6.
Number of lobes to complete curve=34/12×6=17.

Since the printing wheel 50 carries six marking elements evenly spaced about its periphery, and advances ⅙ revolution about its axis for each revolution about the axis O, it will be seen that, with each revolution about the axis O, a different element will be presented to the record roll, and may imprint thereupon its characteristic marking.

The gear ratios of the timing element 13 are so selected and timed in relation to the movements of the printing mechanism that upon the recession of one of the marking elements from the record roll the arm 33 of the switch 32 changes the connection from one thermocouple to another, and the automatic balancing mechanism is given sufficient time to relocate the carriage to a position representative of the measured magnitude before the succeeding element engages the record roll. Thus, the marks upon the record roll will take the form of a family of six interrupted lines 70, 71, 72, 73, 74, and 75, each line being made up of markings having a common identifying characteristic, and forming in itself a graph of one of the six measured magnitudes.

The inking of the several marking elements is accomplished by bringing them successively into contact with the ink-charged pads carried by the gear 58. This gear is so disposed that the peripheries of these pads, as they are carried about their circular path, intersect one of the lobes of the hypotrochoid traced by the marking elements.

Referring to Fig. 7, and starting at point V on the circle 50a, the path of a marking element may be traced through the points $t$—$u$—$v$—$w$, till the lobe marking the highest point of travel of the marking element is reached, and the path of the peripheries of the pads intersected. Since each revolution of the gear 47 produces in the printing wheel 50 a net displacement of 60 degrees or ⅙ revolution in the same sense about its own axis, it follows that for each revolution of the gear 47 about the axis O a different one of the six printing elements passes any selected point on the hypotrochoidal path. Thus, different printing elements successively intersect the path of the inking pads (indicated by the dotted-line position 61a) as the gear 47 completes successive whole revolutions.

The gear 58 which carries the inking pads has 48 teeth, and being driven from the 40-tooth gear 47 through a simple idler, will rotate in the same direction at ⅚ the angular velocity of the gear 47. Thus, if the gears be so timed that the pad 59 intersects the path of the marking elements at the same instant as the marking element 51 reaches the highest point of its travel, the element 52 will reach the same point upon the completion of one revolution of the gear 47, which corresponds to ⅚ of a revolution of the gear 58, so that the pad 60 will then be engaged by the element 52. Similarly, the pad 61 will engage the element 53, and so on, each marking element being engaged and inked by its individual inking pad. Thus, if these pads are charged with different colors of ink, each marking element will imprint on the record a characteristic color, identifying the mark so made with the individual marking element, and, therefore, as hereinabove set forth, with the particular thermocouple which is at the time connected to the measuring circuit.

A sectional view of one of the inking pads is shown in Fig. 4, disclosing the means by which the pad is maintained in a moist condition for extended periods of time. The pad 76, which takes the form of a thick-walled cylinder of felt or similar absorbent material, is carried upon a spindle 77 fixed to the gear member 58. The spindle 77 has formed therein a hollow space 78 communicating with the outer surface of the spindle by one or more openings 79. The outer end of the spindle 77 terminates in a threaded opening 80, having its axis substantially perpendicular to that of the spindle and adapted to be tightly closed by a screw 81. With the gear rotating about a horizontal axis it follows that at some point in the revolution of the spindle 77 about the axis of gear 58 the opening 80 will be vertical, in which position it may be filled with a suitable semi-fluid ink and sealed by the screw 81. The ink will lie in the space 78, and, finding its way through the openings 79 to the pad 76, will serve to keep the same sufficiently moist that a film of ink will be transmitted to the marking element as it is engaged by the pad.

Two alternative forms of marking element are shown in Figs. 5 and 6. That shown in Fig. 5 takes the form of a spherical pointed cylindrical pin 82 having a head 83 by which it is retained behind a gland 84 threaded into a radial opening in the printing wheel 50. A helical compression spring 85 serves to maintain the pin 82 in its extreme radial position, and provides a yielding pressure as the pin is pressed into engagement with the paper chart on the record roll in the act of marking.

The marking element in Fig. 6 takes the form of a small thin-edged wheel or roller 86 carried in a recess or groove on the periphery of the printing wheel, and projecting beyond the surface of the same. The wheel 86 rotates freely on a spindle 87 placed parallel to the axis of the printing wheel, and is subjected to a rolling action each time it engages either the inking pad or the record roll.

While the invention has here been shown as applicable to a multiple recorder in which records are to be made of the values of six more or less independent variables, it will be apparent that the principle may be modified to the recording of any desired number of variables within practical limits of mechanical construction, without departing from the spirit of the invention. Moreover, while the device has been shown as requiring individual ink pads to identify the respective marking elements, it will be apparent that these pads may be eliminated if it is found desirable and practicable to give to each of the marking elements a permanent identifying characteristic, as of form or pigmented material.

I claim:

1. In a recording instrument for successively measuring and recording upon an advancing chart the magnitudes of a plurality of conditions, and including a recording member adapted successively to be commanded by the magnitudes of the respective conditions to be positioned with respect to the chart transversely of its travel and in accord with such magnitudes, said recording member carrying a plurality of marking elements adapted successively to engage said chart and mark thereon indicia representing in their respective positions relative to said chart the values of such magnitudes: a shaft rotatable about a fixed axis, and timing means to rotate the same; and intermediate mechanism for transmitting rotation therefrom to the recording member, said recording member comprising a printing wheel radially supporting the marking elements, and the said transmitting mechanism including an epicyclic gear train having a planetary member carrying the recording member and the elements of the train being so proportioned as to impart continuous rotation and revolution to the said printing wheel whereby the marking elements thereof travel in a cycloidal path in a plane at right angles to the surface of said chart and are successively juxtaposed to said surface at a point in said plane.

2. In a recording instrument for successively measuring and recording upon an advancing chart the magnitudes of a plurality of conditions, and including a recording member adapted successively to be commanded by the magnitudes of the respective conditions to be positioned with respect to the chart transversely of its travel and in accord with such magnitudes, said recording member carrying a plurality of marking elements adapted successively to engage said chart and mark thereon indicia representing in their respective positions relative to said chart the values of such magnitudes: a shaft rotatable about a fixed axis, and timing means to rotate the same; and intermediate mechanism for transmitting rotation therefrom to the recording member, said recording member comprising a printing wheel radially supporting the marking elements, and the said transmitting mechanism including an epicyclic gear train having a planetary member carrying the recording member and the elements of the train being so proportioned as to impart continuous rotation and revolution to the said printing wheel whereby the marking elements thereof travel in a cycloidal path having the form of a hypotrochoid and located in a plane at right angles to the surface of said chart and are successively juxtaposed to said surface at a point in said plane.

3. In a recording instrument for successively measuring and recording upon an advancing chart the magnitudes of a plurality of conditions, and including a recording member adapted successively to be commanded by the magnitudes of the respective conditions to be positioned with respect to the chart transversely of its travel and in accord with such magnitudes, said recording member carrying a plurality of marking elements corresponding in number to the number of conditions to be measured and adapted successively to engage said chart and mark thereon indicia representing in their respective positions relative to said chart the values of such magnitudes: a shaft rotatable about a fixed axis and timing means to rotate the same; and intermediate mechanism for transmitting rotation therefrom to the recording member, said recording member comprising a printing wheel radially supporting the marking elements, and the said transmitting mechanism including an epicyclic gear train having a planetary member carrying the recording member and the elements of the train being so proportioned as to impart continuous rotation and revolution to the said printing wheel whereby the marking elements thereof travel in a cycloidal path in a plane at right angles to the surface of said chart and are successively juxtaposed to said surface at a point in said plane.

4. In a recording instrument for successively measuring and recording upon an advancing chart the magnitudes of a plurality of conditions, and including a recording member adapted successively to be commanded by the magnitudes of the respective conditions to be positioned with respect to the chart transversely of its travel and in accord with such magnitudes, said recording member carrying a plurality of marking elements adapted successively to engage said chart and mark thereon indicia representing in their respective positions relative to said chart the values of such magnitudes; and inking means associated with the recording member: a shaft rotatable about a fixed axis, and timing means to rotate the same; and intermediate mechanism for transmitting rotation therefrom to the recording member, said recording member comprising a printing wheel radially supporting the marking elements, and the said transmitting mechanism including an epicyclic gear train having a planetary member carrying the recording member and the elements of the train being so proportioned as to impart continuous rotation and revolution to the said printing wheel whereby the marking elements thereof travel in a cycloidal path in a plane at right angles to the surface of said chart and are successively juxtaposed to said surface at a point in said plane; and means connecting the transmitting mechanism with the said inking means, the latter being carried by the recording member supporting means and comprising a plurality of inking pads corresponding in number to the number of marking elements, said connecting means affording continuous rotation to the inking means to juxtapose successively a predetermined inking pad to a predetermined marking element.

5. In a recording instrument for successively measuring and recording upon an advancing chart the magnitudes of a plurality of conditions, and including a recording member adapted successively to be commanded by the magnitudes of the respective conditions to be positioned with respect to the chart transversely of its travel and in accord with such magnitudes, said recording member carrying a plurality of marking elements adapted successively to engage said chart and mark thereon indicia representing in their respective positions relative to said chart the values of such magnitudes: an axially elongated gear continuously rotatable about a fixed axis and timing means to rotate the same; a carriage mounted thereon adapted to travel axially thereof; a printing wheel radially supporting the marking elements and movably mounted on said carriage; and a second gear member mounted on said carriage, driven from the elongated gear for continuous rotation, an epicyclic gear train comprising an internal gear fixed to the carriage, and a planet wheel movably mounted upon, and eccentric to, said second gear and meshing with said internal gear, the said planet wheel carrying the said printing wheel and so proportioned as to impart continuous rotation and revolution to the printing wheel whereby the marking elements travel in a cycloidal path in a plane at right angles to the surface of said chart and are successively juxtaposed to said surface at a point in said plane.

6. In a recording instrument for successively measuring and recording upon an advancing chart the magnitudes of a plurality of conditions, and including a recording member adapted successively to be commanded by the magnitudes of the respective conditions to be positioned with respect to the chart transversely of its travel and in accord with such magnitudes, said recording member carrying a plurality of marking elements adapted successively to engage said chart and mark thereon indicia representing in their respective positions relative to said chart the values of such magnitudes: a rotatable and axially elongated gear; a carriage mounted thereon adapted to travel axially thereof; a printing wheel radially supporting the marking elements and movably mounted on said carriage; a second gear member mounted on said carriage, driven from the elongated gear for continuous rotation, an epicyclic gear train comprising an internal gear fixed to the carriage, and a planet wheel movably mounted upon, and eccentric to, said second gear and meshing with said internal gear, the said planet wheel carrying the said printing wheel; and a further gear member supported by the carriage and continuously driven from said second gear at an angular velocity different from that of the second gear, and inking elements carried by the said further gear member corresponding in number to the marking elements and equidistantly spaced over said further gear member, the latter bearing a ratio to the second gear member such that the respective inking elements will be juxtaposed to predetermined marking elements.

7. In a recording instrument for successively measuring and recording upon an advancing chart the magnitudes of a plurality of conditions, and including a recording member adapted successively to be commanded by the magnitudes of the respective conditions to be positioned with respect to the chart transversely of its travel and in accord with such magnitudes, said recording member carrying a plurality of marking elements adapted successively to engage said chart and mark thereon indicia representing in their respective positions relative to said chart the values of such magnitudes: a rotatable and axially elongated gear; a carriage mounted thereon adapted to travel axially thereof; a printing wheel radially supporting the marking elements and movably mounted on said carriage; a second gear member mounted on said carriage, driven from the elongated gear for continuous rotation, a planetary train comprising an internal gear fixed to the carriage, and a planet wheel movably mounted upon, and eccentric to, said second gear and meshing with said internal gear, the said planet wheel carrying the said printing wheel; and a further gear member supported by the carriage and continuously driven from said second gear at an angular velocity different from that of the second gear, and inking elements carried by the said further gear member adapted to be brought thereby into engagement with successive marking elements at certain points in their travel, the ratio of the planetary train bearing to that between said further gear and said second gear such a relationship that the net angular displacement of a marking element about the axis of rotation of the planet wheel of the planetary train corresponding to a single revolution of said second gear member is the same as that of one of said inking elements about the axis of rotation of said further gear member, corresponding to a complete rotation of said second gear member.

8. In mechanism for successively marking a plurality of indicia on a record surface, a rotatable element having circularly disposed upon the same a plurality of marking members, an epicyclic gear train including coacting gear members one of which is a planet wheel and carries said rotatable element, a shaft and means to rotate the same together with intermediate mechanism for imparting therefrom to said planet wheel continuous rotation and a simultaneous continuous rolling action relative to another element of the train, and the said gear members being so proportioned that said marking members follow in succession a common cycloidal path in a plane at right angles to the record surface and osculating said surface and are successively juxtaposed to said record surface at a point in said plane.

9. In mechanism for successively marking a plurality of indicia on a record surface, a rotatable element having circularly disposed upon the same a plurality of marking members, an epicyclic gear train including a planet wheel attached to said element, a non-rotating gear of said train with which said planet wheel meshes, said planet wheel and gear being so proportioned that said marking members follow in succession a common cycloidal path in a plane at right angles to the record surface and osculating said surface, a shaft rotatable about a fixed axis and timed means to rotate the same, together with intermediate mechanism for imparting therefrom revolution to said planet wheel, whereby said marking members are successively juxtaposed to said record surface at a point in said plane.

OZRO H. HUNT.